(12) United States Patent
Lefevre

(10) Patent No.: US 6,337,940 B1
(45) Date of Patent: Jan. 8, 2002

(54) WAVELENGTH FILTERING SELF-ALIGNED RETROREFLECTING OPTICAL SYSTEM, A MONOCHROMATOR AND A LASER INCORPORATING SUCH A SYSTEM

(75) Inventor: Hervé Lefevre, Paris (FR)

(73) Assignee: Photonetics, Marly le Roi (FR)

( * ) Notice: Subject to any disclaimer, the term of this patent is extended or adjusted under 35 U.S.C. 154(b) by 0 days.

(21) Appl. No.: 09/503,183

(22) Filed: Feb. 14, 2000

(30) Foreign Application Priority Data

Feb. 15, 1999 (FR) .............................. 99 01790

(51) Int. Cl.$^7$ ................................................ G02B 6/34
(52) U.S. Cl. ........................... 385/37; 385/14; 385/18; 385/47
(58) Field of Search ........................... 385/14, 18, 36, 385/37, 47

(56) References Cited

U.S. PATENT DOCUMENTS

| | | | | |
|---|---|---|---|---|
| 3,836,249 A | * | 9/1974 | Weber | 355/51 |
| 5,594,744 A | * | 1/1997 | Lefevre et al. | 372/20 |
| 5,802,085 A | * | 9/1998 | Lefevre et al. | 372/20 |
| 5,886,785 A | * | 3/1999 | Lefevre et al. | 356/328 |
| 6,084,695 A | * | 7/2000 | Martin et al. | 359/131 |
| 6,088,496 A | * | 7/2000 | Asghari | 385/37 |
| 6,249,364 B1 | * | 6/2001 | Martin et al. | 359/130 |

FOREIGN PATENT DOCUMENTS

| | | |
|---|---|---|
| DE | 19532611 | 7/1996 |
| EP | 0801451 | 10/1997 |
| FR | 2754054 | 4/1998 |

OTHER PUBLICATIONS

An English Language abstract of JP 62 075406.
An English Language abstract of JP 57 099793.

* cited by examiner

*Primary Examiner*—Rodney Bovernick
*Assistant Examiner*—Jennifer Doan
(74) *Attorney, Agent, or Firm*—Arent Fox Kintner Plotkin & Kahn

(57) ABSTRACT

A single dimension self-aligned retroreflecting optical system for wavelength filtering, comprising at least one waveguide with one internal face in a focal plane of collimation optics generating a main collimated beam. A diffraction grating has parallel lines, the lines disperse, in collimated beams, the different wavelengths of the main beam in directions parallel to a dispersing plane, the dispersing plane being perpendicular to the lines of the grating. A reflector system generates self-alignment in a longitudinal plane perpendicular to the dispersing plane. The reflector system comprises a spherical lens and a single dimension self-aligned reflector arrangement, the dimension being parallel to the dispersing plane of the grating.

11 Claims, 5 Drawing Sheets

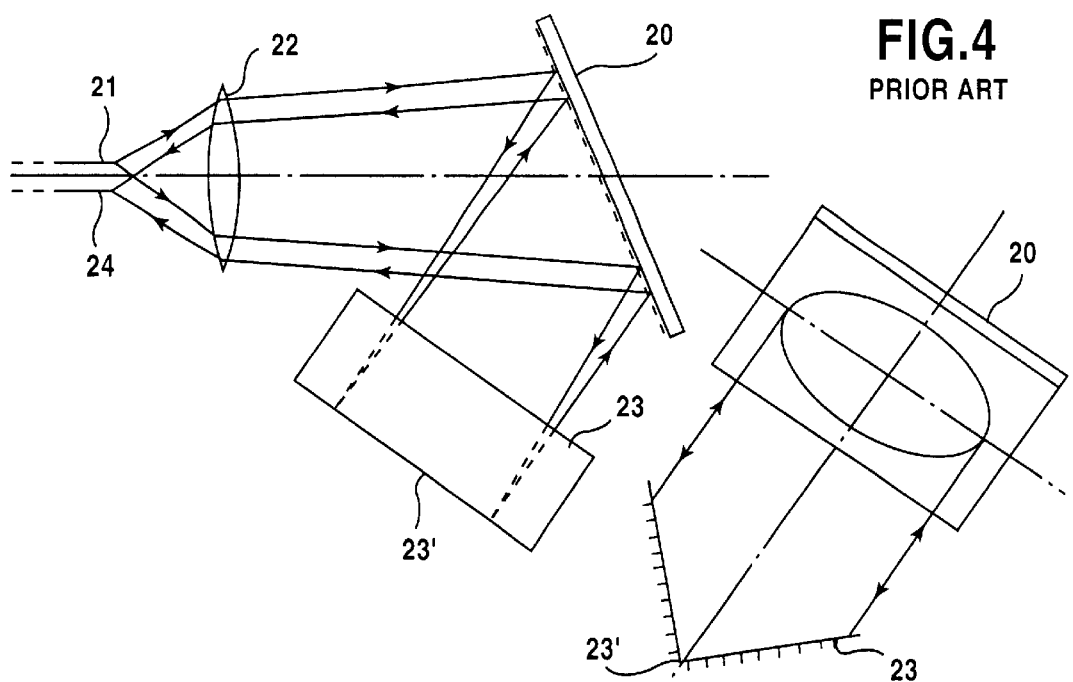
FIG.4
PRIOR ART
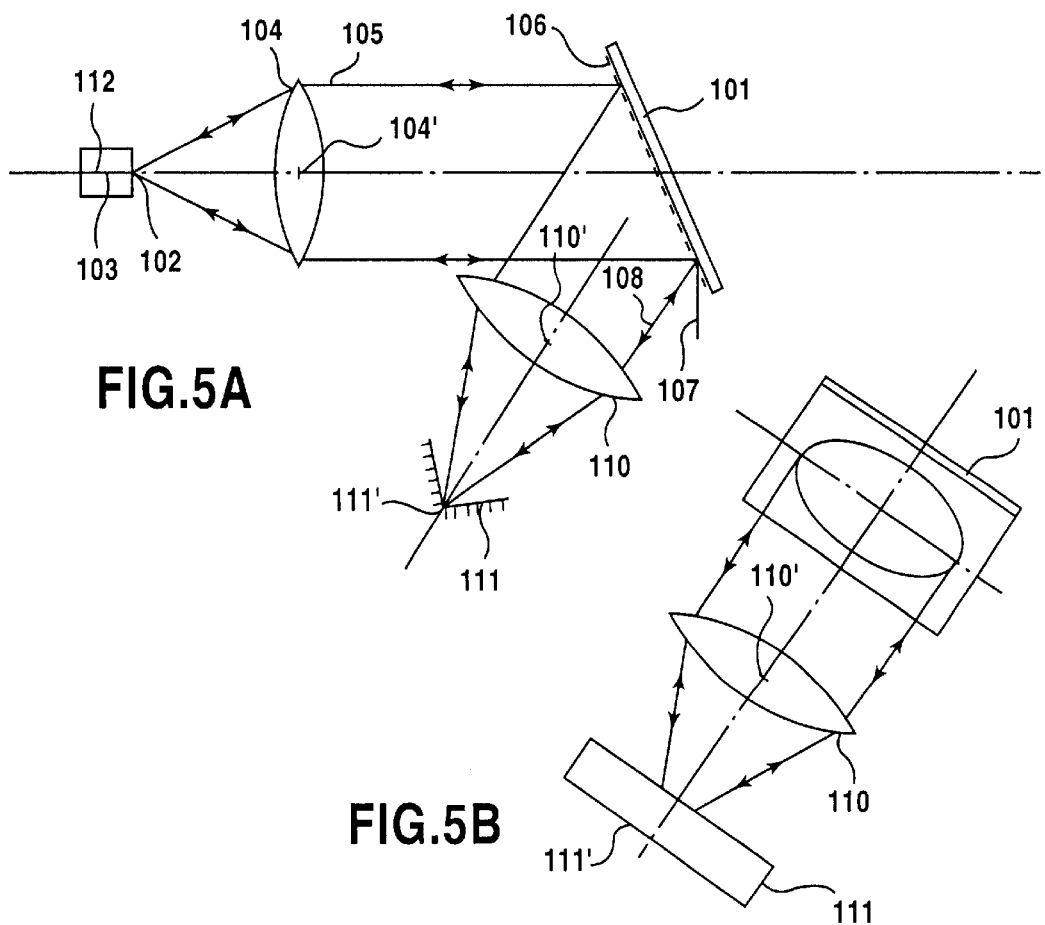
FIG.5A
FIG.5B

WAVELENGTH FILTERING SELF-ALIGNED RETROREFLECTING OPTICAL SYSTEM, A MONOCHROMATOR AND A LASER INCORPORATING SUCH A SYSTEM

CROSS-REFERENCE TO RELATED APPLICATIONS

The present application claims priority under 35 U.S.C. §119 of French Patent Application No. 99 01790, filed on Feb. 15, 1999.

BACKGROUND OF THE INVENTION

1. Field of the Invention

This invention relates to a wavelength filtering self-aligned retroreflecting optical system.

2. Discussion of Background Information

It is common knowledge that alignment of the optical components is critical for the quality of devices that are fitted with the components. Therefore, any self-alignment, i.e. any assembly in which the properties of the luminous flux are somewhat sensitive to the orientation or to the position of one or several components, is required.

Among the self-aligned retroreflecting systems known for a long time, the following can be mentioned for exemplification purposes: the cube corner illustrated in FIG. 1 with which an incident beam 1, 1' on a reflecting orthogonal trihedron 3 produces a parallel output beam 2, 2', without regard to the angle of incidence with respect to the diagonal 5 of the cube and the position of the point of incidence 4.

The so-called 'cat's eye' assembly is also well known, consisting of a convergent optical system 8 with optical axis 9, in the focal plane of which is placed a mirror 10, more or less perpendicular to the axis 9. A collimated incident beam 11, 11' converges onto the mirror 10, is reflected on the mirror and then diverges in return onto the optical system 8 that produces an output beam 12, 12', also collimated and parallel to beam 11, 11'. Such a cat's eye is represented in FIG. 2.

Both systems described previously offer self-alignment of the direction of the output beam 2, 2' and 12, 12' on the input beam, respectively 1, 1' and 11, 11' in two dimensions, i.e. in all the planes parallel to the direction of the input beams. In certain systems, self-alignment in a single dimension is desirable. In that case, an orthogonal dihedron instead of the trihedron of FIG. 1 or a cylindrical cat's eye is used i.e. a lens or a cylindrical optical system instead of the spherical optical system 8 shown in FIG. 2. The dihedron ensures self-alignment in the plane perpendicular to its edge and the cylindrical lens in the plane perpendicular to its generatrix. In the parallel plane, both these systems behave like a mirror.

Optical systems carrying out wavelength filtering are also known the most conventional of which, as represented in FIG. 3, consist of a dispersing system 14 placed between an input slot 15 and an output slot 16 and receiving a wide-spectrum luminous flux 17 under an angle of incidence i. The output luminous flux 18 is spread, its direction depending on the wavelength and only beam 19 selected by the output slot 16 is transmitted by the system. It is also possible to provide a two-stage spectral filtering, whereas an intermediate slot 15', placed between two gratings 14 and 14' contribute to limit the spurious light transmitted.

The plane perpendicular to the lines of the grating containing the central ray of the incident beam and the central rays of the beams dispersed by the grating is traditionally called 'dispersing plane'. For each beam, the 'transversal plane' shall be defined as the plane perpendicular to the central ray and the 'longitudinal plane' shall be defined as the plane perpendicular to the dispersing plane containing the central ray.

A device of the previous art, is represented in FIG. 4, where the orthogonal dihedron 23 has an edge 23' parallel to the dispersing plane. This arrangement leads to a mirror-like behavior in this latter plane and to a self-aligned behavior in the longitudinal plane.

A wavelength filtering self-aligned retroreflecting optical system can be used for instance for filtering wavelengths in order to realize the external cavity of wavelength tuneable laser or to select a wavelength. The optical system is very schematically represented in the latter application in FIG. 4. The grating 20 receives an output luminous flux from a first monomode optical wave-guide 21 through the lens 22. The grating 20 diffracts it to the orthogonal dihedron 23 whose edge 23' is parallel to the dispersing plane of the grating and this dihedron returns it. The grating 20 diffracts this flux again, on the return path, in a direction depending on its wavelength. Thus, only the flux at a wavelength corresponding to the position of the second wave-guide 24 is coupled in the latter. These wave-guides can be in particular optic fibers.

It has been noticed that the performances of the latter device depend to a large extent on the accuracy of the orthogonal dihedron. The purpose of this invention is the realization of a self-aligned retroreflecting optical system that enables good tolerances of the properties of its components; in particular as regards the value of the angle of the dihedron thereby involved.

SUMMARY OF THE INVENTION

The purpose of the invention is to offer a device that would solve the above mentioned problems while preserving the advantages of the self-aligned systems known, wherein the reflector behaves like a mirror in the dimension of the dispersing plane and has a self-aligned behavior in the dimension of the longitudinal plane.

Another object of the invention is to enable the realization of a two-stage wavelength selective assembly, in which the adjustment of the position of the intermediate slot is made easier.

To this end, the invention relates to a single dimension self-aligned retroreflecting optical system, for wavelength filtering, comprising:
  at least one wave guide with one internal face in the focal plane of collimation optics generating a main collimated beam,
  a diffraction grating with parallel lines whereas the said lines disperse, in collimated beams, the different wavelengths of the main beam in directions parallel to the dispersing plane that is perpendicular to the lines of the grating,
  a reflector system generating self-alignment in the longitudinal plane perpendicular to the dispersing plane.

According to the invention, the reflector consists of a spherical lens and of a single dimension self-aligned reflector system, whereas the said dimension is parallel to the dispersing plane of the grating.

In different embodiments, each exhibiting specific advantages:
  it comprises a single fiber transmitting an input luminous flux and collecting the output luminous flux;
  it comprises at least two fibers, one transmitting an input luminous flux, the other collecting an output luminous flux;

the single dimension self-aligned reflector system is a reflector dihedron whose edge is perpendicular to the dispersing plane of the grating and is placed in the focal plane of the lens;

the reflector dihedron is a double total internal reflection prism;

a reflector dihedron forms an angle of approximately 90°;

at least one of both mirrors of the reflector dihedron has reduced lateral sizes;

the self-aligned reflector system consists of two perpendicular mirrors carried on supports that are independent from another;

each mirror is of limited dimension;

the size of the wave guide modes is broader;

the polarization splitter with parallel outputs is inserted between the collimation optics and the grating and the center of the lens is placed in the middle of the space between the output beams of this splitter;

a horizontal edge dihedron leads a quadruple passage on the grating. whereas the light reaches the self-aligned retroreflector after two passages on the grating.

The invention also relates to a monochromator:

In a first embodiment, a wave-guide is passive and forms the input slot and the output slot of the monochromator.

In a second embodiment, a first passive wave-guide forms the input slot of the monochromator and a second passive wave-guide forms its output slot.

The invention also relates to a laser incorporating such a self-aligned reflector system. In such a case, a wave-guide delineates a wavelength tuneable external cavity laser between its extremity and the single dimension self-aligned reflector system.

BRIEF DESCRIPTION OF THE DRAWINGS

The invention will be described more in detail with reference to the appended drawings in which:

FIG. 4 represents a single dimension self-aligned spectral filtering device of the previous art in a Littman-Metcalf configuration;

FIGS. 5A and 5B are a first embodiment of the invention involving a beam in a Littman-Metcalf configuration, according to the invention;

DETAILED DESCRIPTION OF THE PRESENT INVENTION

Figure 3:
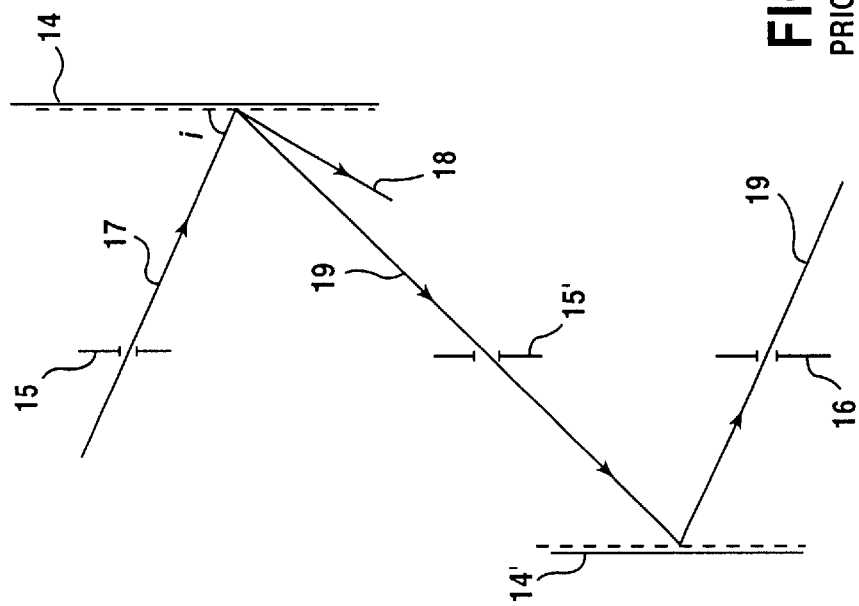
FIG. 3 represents a spectral filtering device of the previous art.
Figure 1:
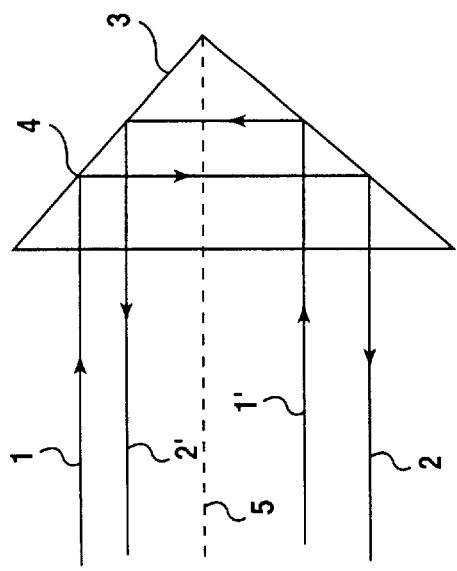
FIG. 1 represents a cube corner forming a two-dimension self-aligned device of the previous art.
Figure 2:
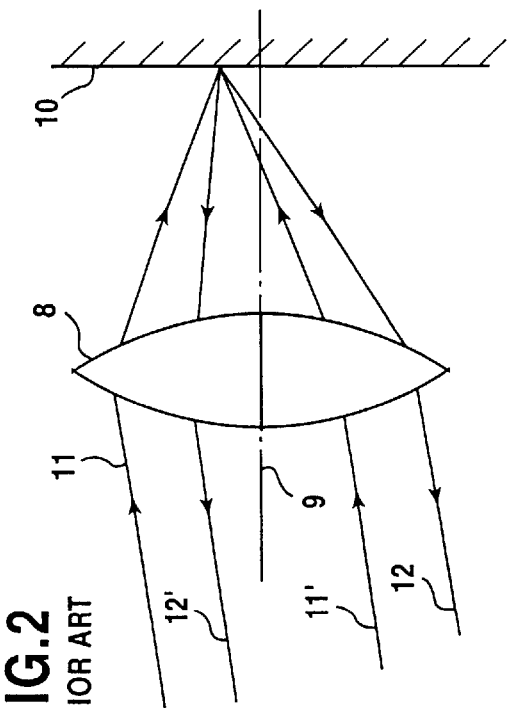
FIG. 2 represents a cat's eye also forming a two-dimension self-aligned device of the previous art.

The wavelength filtering self-aligned retroreflecting optical system of the invention comprises a grating 101. A monomode wave-guide 103 transmits at its extremity 102 a luminous flux that is collimated by the optical system 104 with its center 104' into a main beam 105. The plane diffraction grating 101 carries equidistant parallel lines 106 that delineate a perpendicular plane more or less parallel to the beam 105 and called a dispersing plane of the grating 101.

The main incident beam 105 is diffracted by the grating 101, in the dispersing plane, and produces diffracted beams 108 whose direction depends on the wavelength. These beams are reflected by the single dimension self-aligned reflector system, here a reflector dihedron 111, in the form of a double total reflection prism, preferably 90°, whose edge 111' is perpendicular to the dispersing plane of the grating, and is placed in the focal plane of a lens 110, with center 110'.

In a first embodiment, the monomode wave-guide 103 collects the output flux of the system.

In a second embodiment, a second wave-guide 112 collects the output flux.

In the device of the invention, the dihedron 111 has an edge 111' perpendicular to the dispersing plane. It has therefore a mirror-like behavior in the longitudinal, but the dihedron is associated with the optics 110, which leads in fact to a device with, in the longitudinal plane, the properties of cat's eye and hence to the self-alignment required. In the dispersing plane, the lens 110/dihedron 111 combination produces an effect equivalent to a mirror that would have a normal line parallel to the axis delineated by the center 110' of the lens 110 and the edge 111' of the dihedron 111. The self-alignment of the dihedron is opposite that of the cube corner and both effects negate each other, which implies that the dimension perpendicular to the edge of the dihedron shows a behavior equivalent to that of a mirror without any self-alignment.

With respect to the state of the prior art, the accuracy required for the angle of the dihedron of the invention is reduced.

Indeed, good self-alignment imposes that the phase front of the reflected beam should overlap that of the incident by more than $\lambda/4$.

By implementing a dihedron according to the state of the prior art, operating with collimated beams with a few millimeters in width, the orthogonal accuracy of the dihedron, i.e. the value of its angle at the 90° apex, must be approximately $10^{-4}$ rad (i.e. 5 seconds of an arc). In the device of the invention, the beam converges toward the dihedron where the image of the input wave is formed. The size of this image is typically a few tens of microns, i.e. two orders of magnitude below the previous case.

In order to obtain the same accuracy on the self-alignment, the load exerted on the accuracy of the angle of the dihedron can then be relaxed by two orders of magnitude and therefore, according to the invention, a dihedron with an accuracy on its apex angle of $10^{-2}$ rad (i.e. 0.50°) instead of the $10^{-4}$ rad of the state of the art suffices.

Moreover, certain flux losses of the previous devices are avoided. In order to avoid flux losses when implementing a prior art device, the collimated beams coming from the guides 21 and 24 must overlap each other on the dihedron 23. This requires the optical distance between the dihedron 23 and the lens 22 to be equal to the balanced anamorphosis distance of the beams on the grating between the lens 22 and the ends of the fibers 21, 24, i.e. equal to the focal distance of the balanced anamorphosis distance of the beams on the grating. For practical space requirement reasons, this is not always possible. The invention enables overlapping the beams, regardless of the distances between the lens 104 and the dihedron on the one hand, and the ends of the fibers 103 and 112 on the other, while maximizing the angle of the dihedron.

Figure 5C:
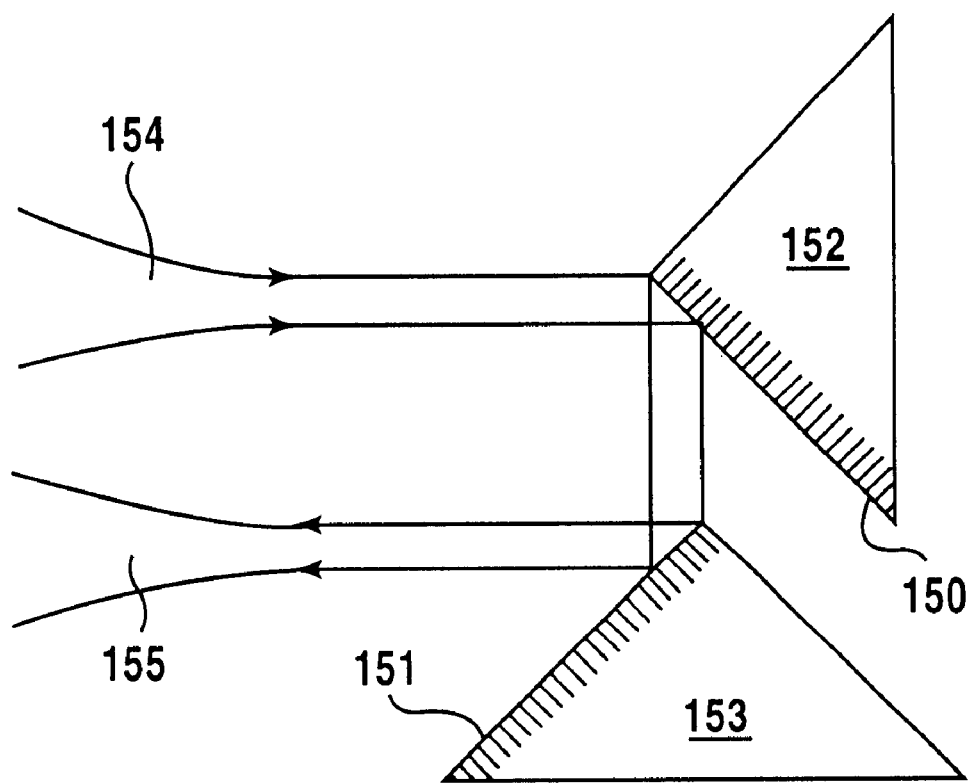
FIG. 5C represents a particular embodiment of a reflector usable for the implementation of the invention.

Thus, a monochromator as represented in FIG. 5 can be realized. An output wave-guide 112 collects, in return, a portion of the flux emitted by the input wave-guide 103 whose wavelength depends on the transversal position of this output wave-guide 112, the properties of the grating 101 and its orientation. In such a case, using a dihedron 111 with small geometrical sizes enables restricting the image of the end 102 of the wave-guide 103, to this dihedron 111 and thereby to make it fulfil the usual function of the intermediate slot of a double monochromator (a two-stage monochromator). Thus, spectral selection is improved while suppressing the light diffused by the grating.

The dihedron 111 can also be made of two mirrors 150 and 151 perpendicular to one another, as represented in FIG. 5A.

These mirrors 150, 151 are each advantageously small-sized and are carried out by prisms 152 and 153. It is thus possible to adjust the positions of these mirrors 150 and 151, independent from one another, and thereby to control independently the extremities of the pass-band of the filtered thus formed. The incident beams reflected by this dihedron are referred to as 154 and 155.

The output wave-guide 112 can overlap the input wave-guide 103, as shown in the embodiment of FIG. 5. Obviously, these guides can be materially different and, for instance, be placed beside one another. It is also possible to realize a wavelength demultiplexer while using several output wave-guides 112, placed beside one another, each collecting a portion of the wavelength-selected flux, in relation to its position.

If the wave-guide 103 is an active wave-guide used simultaneously at input and at output, it is possible to realize an external cavity laser, whereas this cavity is formed between the rear face of the wave-guide and the dihedron 111.

The size of the wave-guide modes is advantageously broader, for instance while exhibiting micro-lenses at the extremity 102 of the wave-guides 103.

A polarization splitter with parallel outputs, inserted between the collimation optics 104 and the grating 101, enables exchange of the polarization between the passages respectively during the way out and the way back on the grating 101. Thus, the polarization defects likely to be injected by the grating 101 are avoided. The center 110' of the lens 110 is then positioned in the middle of the space between the output beams of this splitter.

A dihedron 125 with horizontal edge makes possible quadruple passage of the beams on the grating 101, whereby the light reaches the self-aligned retroreflector 111 after two passages over this grating.

Figure 7:
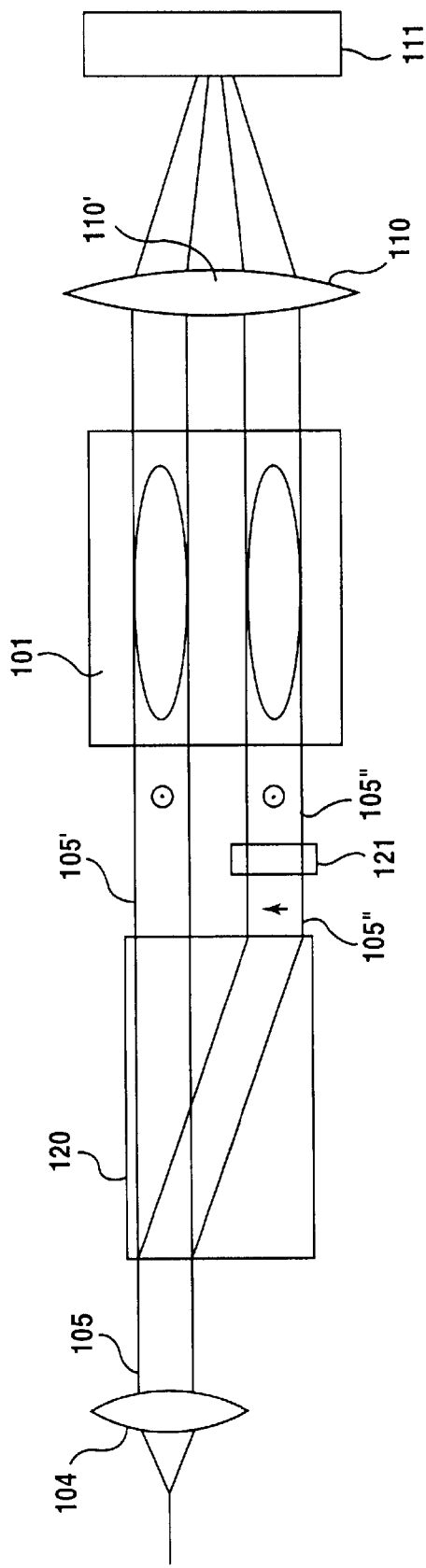
FIG. 7 is a dispersing device with a double passage on the grating, of the prior art, according to the invention.
Figure 8:
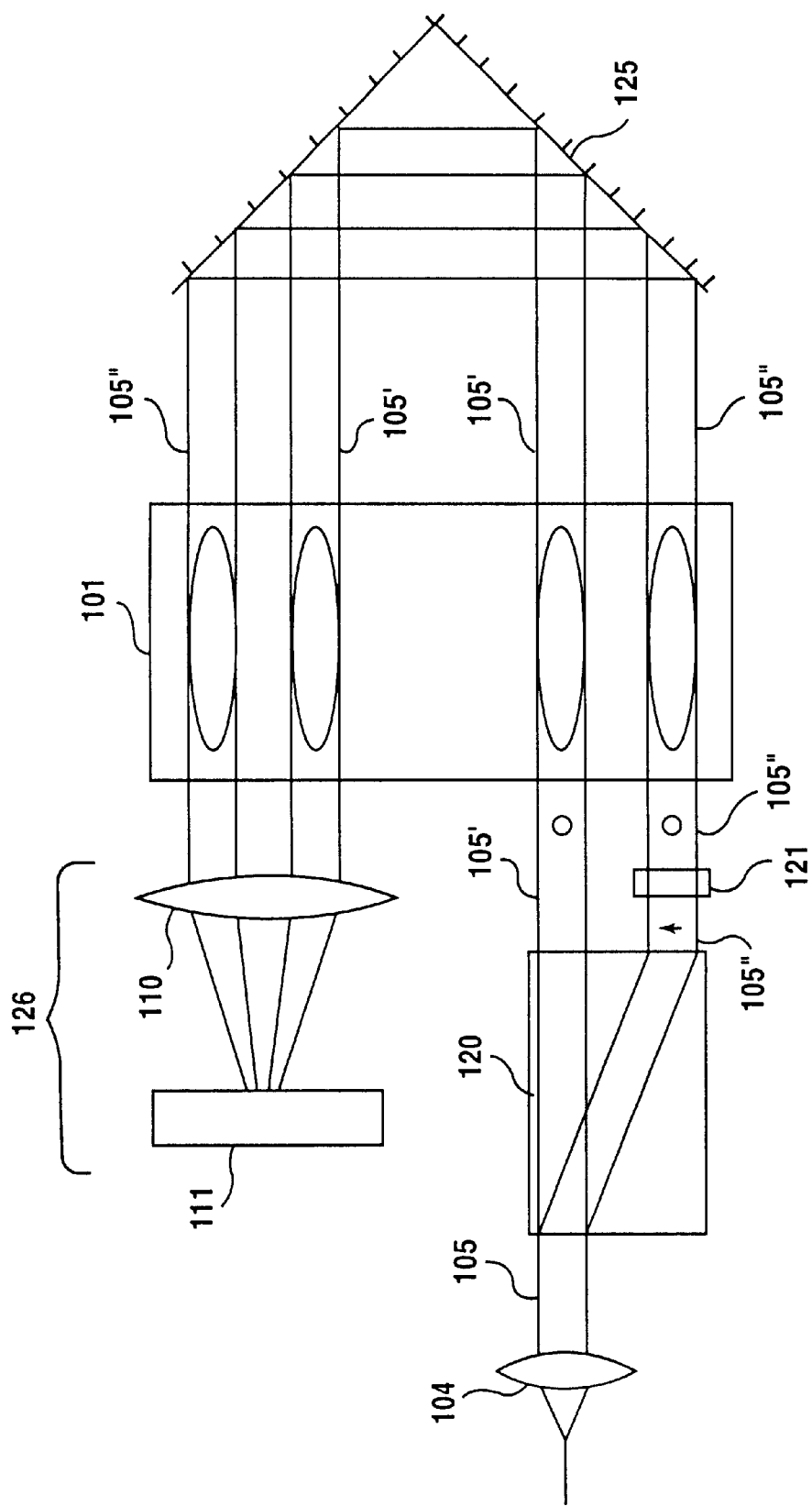
FIG. 8 is a dispersing device with a quadruple passage on the grating, of the prior art, according to the invention.

This embodiment is more particularly described with reference to FIGS. 6, 7 and 8.

Figure 6:
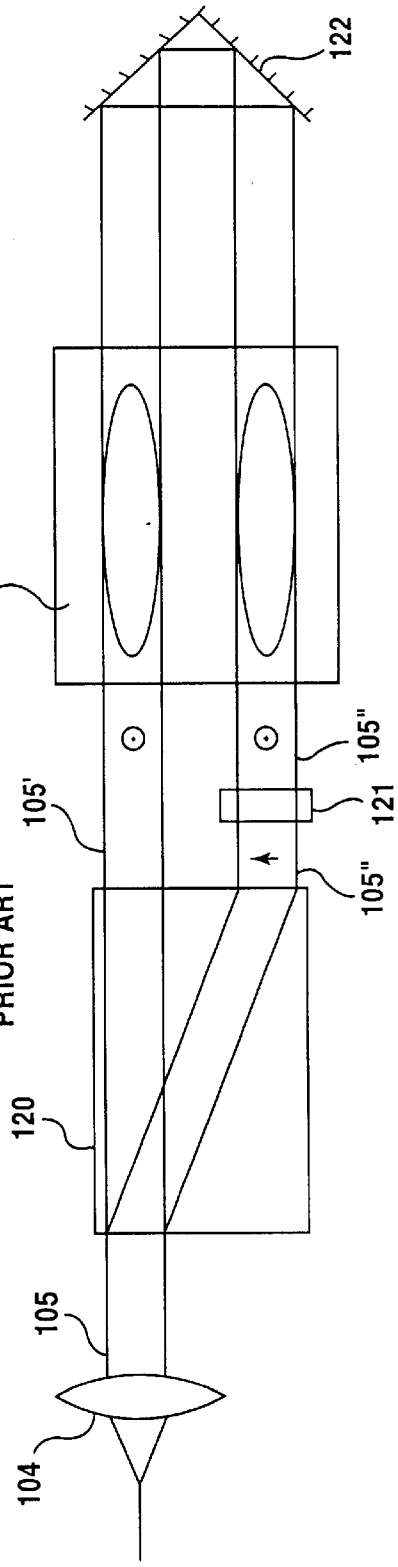
FIG. 6 dispersing device with a double passage on the grating, of the prior art.

FIG. 6 represents a device of the prior art such as described, for example in the patent application FR-2.754.054. The polarization splitter 120 generates from the beam 105 two parallel beams with orthogonal polarization 105' and 105". A λ/2 blade 121 is placed on the beam 105" and rotates the polarization direction of the beam, so that the polarization direction of both beams 105' and 105" is perpendicular to the lines of the grating 101. After dispersion of both these beams by the grating 101, these are exchanged by the dihedron 122. This device that has been described in detail in the French patent FR-2.754.054, in an optical spectrum analyser, enables realization of a device in which the losses caused by the diffraction over the grating, are minimized and, at the same time, a high accuracy device is obtained, insensitive to the polarization of the incident beam 105.

According to this invention, it is possible to replace the dihedron 122 with the assembly formed by the lens 110 and the dihedron 111.

All the advantages of the device described previously are thus obtained as the same time the restriction on the angle of the dihedron 122 is eliminated since, as divulged above, the assembly formed by the lens 110 and the dihedron 111 operates correctly even if the angle of the dihedron 111 is only approximately 90°.

In this same French patent FR-2.754.054, a 'third embodiment' involving a four-passage configuration of the beam over the grating, forming a double stage assembly, was described.

In this device, a dihedron 125, of large size with respect to the transverse dimension of the beams, redirects them, after their first passage over the grating so that they are diffracted by the latter again and the self-aligned retroreflecting optical system 126 exchanges these beams with one another and redirects them toward the grating so that each of them is again diffracted twice.

The self-aligned retroreflecting optical system 126 complies advantageously with this invention and consists therefore of a lens 110 in whose focal plane is placed a dihedron 111 whose edge is perpendicular to the dispersing plane of the grating.

In an alternate embodiment, a concave grating could be used instead of the plane grating 101, whereas the grating performs itself the collimation of the beam originated from the wave guide 103 or the convergence on the dihedron 111 and enables respective suppression of the optical system 104 or 110.

What is claimed is:

1. A single dimension self-aligned retroreflecting optical system for wavelength filtering, comprising:
    at least one wave-guide with one internal face in a focal plane of collimation optics generating a main collimated beam;
    a diffraction grating having parallel lines, said lines disperse, in collimated beams, the different wavelengths of the main beam in directions parallel to a dispersing plane, the dispersing plane being perpendicular to the lines of the grating;
    a reflector system generating self-alignment in a longitudinal plane perpendicular to the dispersing plane;
    wherein the reflector system comprises a spherical lens and a single dimension self-aligned reflector arrangement, the said dimension being parallel to the dispersing plane of grating.

2. The self-aligned retroreflecting optical system according to claim 1, wherein the single dimension self-aligned reflector arrangement comprises a reflector dihedron whose edge is perpendicular to the dispersing plane of the grating and is placed in a focal plane of the lens.

3. The self-aligned retroreflecting optical system according to claim 2, wherein the reflector dihedron is a double total internal reflection prism.

4. The self-aligned retroreflecting optical system according to claim 2, wherein the reflector dihedron forms an angle of approximately 90°.

5. The self-aligned retroreflecting optical system according to claim 2, wherein at least one of the mirrors of the reflector dihedron has reduced lateral sizes.

6. The self-aligned retroreflecting optical system according to claim 1, wherein the size of the wave-guide is broader.

7. The self-aligned retroreflecting optical system according to claim 1, wherein a polarization splitter with parallel output beams is inserted between the collimation optics and the grating and that a center of the lens is placed in the middle of a space between the output beams of this splitter.

8. The self-aligned retroreflecting optical system according to claim 1, further comprising an additional dihedron with its edge parallel to the dispersing plane leading to a quadruple passage on the grating, light reaching the self-aligned retroreflector arrangement after two passages on the grating.

9. A monochromator incorporating a self-aligned retroreflecting optical system according to claim 1, wherein said at least one wave-guide is passive and forms an input slot and an output slot of the monochromator.

10. A monochromator incorporating a self-aligned retroreflecting optical system according to claim 1, wherein the at least one wave-guide comprises two wave-guides, a first passive wave-guide forming an input slot of the monochromator and a second passive wave-guide forming its output slot.

11. A laser incorporating a self-aligned retroreflecting optical system according to claim 1, wherein a wave-guide delineates a wavelength tuneable external cavity laser between its extremity and the single dimension self-aligned reflector arrangement.

* * * * *